(12) United States Patent
Metelski

(10) Patent No.: US 6,637,274 B2
(45) Date of Patent: Oct. 28, 2003

(54) STAND WITH A PARALLELOGRAM CARRIER AND BALANCING MECHANISM

(75) Inventor: Andrzej Metelski, Romanshorn (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 10/008,285

(22) Filed: Nov. 8, 2001

(65) Prior Publication Data

US 2002/0144558 A1 Oct. 10, 2002

(30) Foreign Application Priority Data

Nov. 12, 2000 (DE) .......................................... 200 19 106

(51) Int. Cl.⁷ .............................. G01N 3/00; G01L 1/04; G01L 1/08; A47F 5/00
(52) U.S. Cl. ................. 73/788; 73/862.621; 73/862.61; 248/123.11; 248/123.2
(58) Field of Search ........................... 73/788, 862.621, 73/862.61; 248/123.11, 123.2, 550, 901; 606/1; 177/210 C

(56) References Cited

U.S. PATENT DOCUMENTS

| 4,582,152 A | * | 4/1986 | Gibbons ................. 177/210 C |
| 5,528,417 A | | 6/1996 | Nakamura |
| 5,721,399 A | * | 2/1998 | Latiri .......................... 177/201 |
| 5,918,284 A | * | 6/1999 | Blanch et al. ................. 73/827 |
| 6,425,865 B1 | * | 7/2002 | Salcudean et al. .......... 600/437 |

FOREIGN PATENT DOCUMENTS

| DE | 43 20 443 A1 | 12/1994 |
| DE | 43 34 069 A1 | 4/1995 |
| WO | WO 97/13997 | 4/1997 |
| WO | WO 97/47240 | 12/1997 |

* cited by examiner

Primary Examiner—Edward Lefkowitz
Assistant Examiner—Lilybett Martir
(74) Attorney, Agent, or Firm—Hodgson Russ LLP

(57) ABSTRACT

The invention relates to a stand having a parallelogram carrier (2b) and a balancing device, in which, between a support arm (60) that runs substantially horizontally and a basic part (62) that can be braked with respect to a basic body (12), there is arranged at least one measuring unit (64) to measure and absorb the imbalance forces and moments which arise.

20 Claims, 9 Drawing Sheets

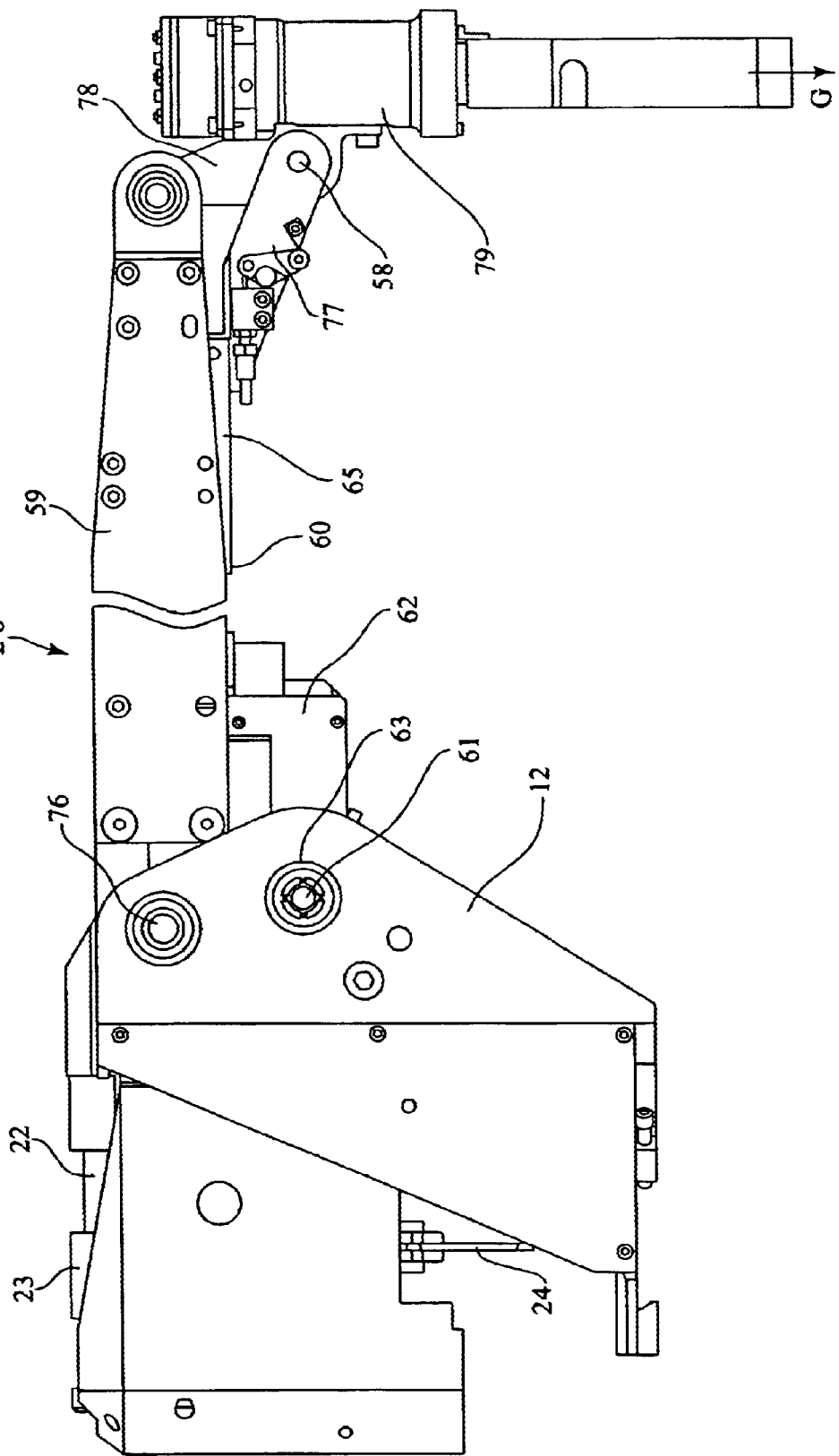

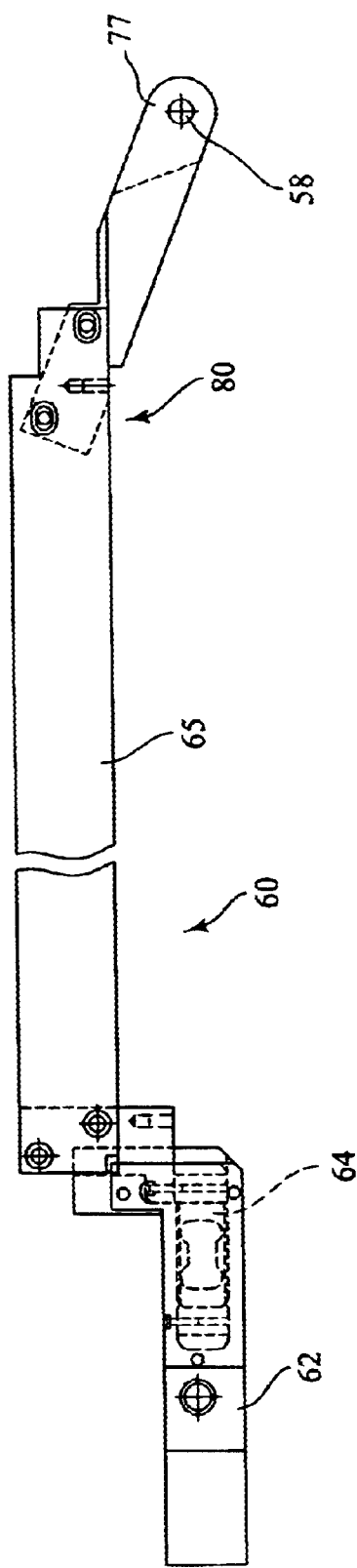
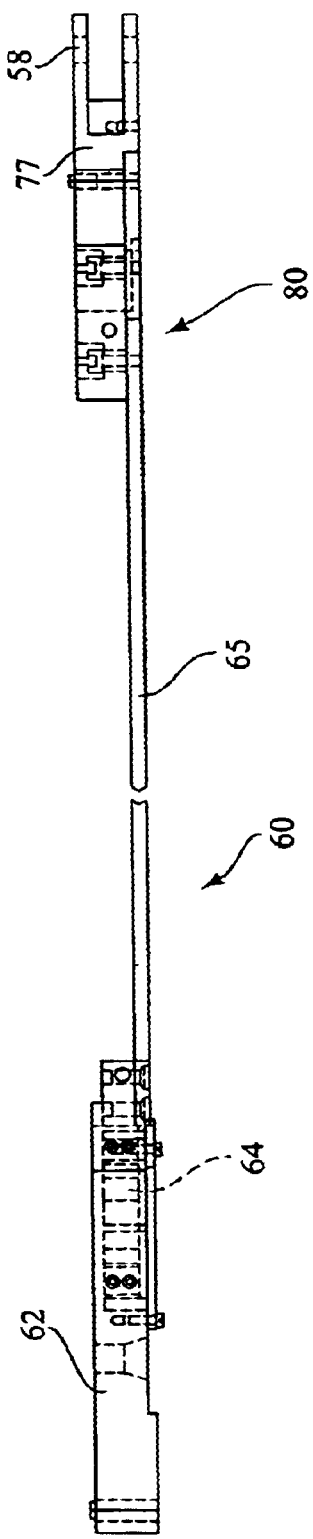

STAND WITH A PARALLELOGRAM CARRIER AND BALANCING MECHANISM

CROSS REFERENCE TO RELATED APPLICATIONS

This invention claims priority of the German application 200 19 106.3 filed Nov. 12, 2000 which is incorporated by reference herein.

FIELD OF THE INVENTION

The invention relates to a stand, capable of being balanced, having a parallelogram carrier that accommodates a load and comprises at least three support arms, of which two parallel support arms are supported with respect to a base, and having a measuring unit in the area of one of the support arms.

BACKGROUND OF THE INVENTION

Stands with electronic balancing mechanisms have measuring units which measure an imbalance. Such measuring units are, for example, published in U.S. Pat. No. 5,528,417, in DE 4320443 A1 and DE 4334069 A1 and in WO 97/13997 from the applicant. The known measuring units frequently measure bending forces or travel resulting from bending in a braked stand. If appropriate, they use angle sensors, optical position sensors or bending sensors. A braked stand is understood to mean a stand of which at least one support arm is held by means of a brake so that it does not pivot with respect to the uprights. In practice, such brakes are as rule arranged between points fixed to the uprights and parallelogram carriers or between adjacent arms of a parallelogram carrier.

SUMMARY OF THE INVENTION

The invention is based on the object of providing a new generation of measuring units which can be implemented with particularly cost-effective, available sensors and can be mounted as simply as possible and/or integrated into stand components. This object is achieved by the following measures.

In the area of one of the parallel support arms of the parallelogram carrier, preferably on one of the two horizontal support arms, a compressive-force, shear force or bending sensor is arranged, which measures forces between a part of the support arm that is connected to the load and a braked part of the stand, and provides the measured values for the balancing control system.

In the process, the following criteria are satisfied, or use is made of the following laws:

a) The support arm is held in a brake-free manner. It follows from this that, if the load is balanced, it remains at the selected location. However, if the support arm is not balanced, then the load tends to drift away from the selected location.

b) Provided parallel to at least one of the supports or on a support belonging to the parallelogram carrier is a sensor which detects this drift.

c) The measured drift behavior controls the balancing.

As a variant of a different type, a sensor is alternatively incorporated directly in one of the supports of the parallelogram carrier, and measures the bending or shear forces occurring there. As a result of integrating a sensor into a weakened or interrupted point of a support arm in a parallelogram carrier, firstly a good integrated solution is found, which saves space. Secondly, however, the measurement is displaced to a location which is present in any stand with parallelogram carriers. The measuring unit itself can therefore be produced as a standard product, which can be used in any desired parallelogram carrier.

This applies equally to the first-named variant, in which the drift behaviour of the carrier is measured on its outside. A shear force sensor is particularly suitable for the application in the sense of the invention, being mounted at the interrupted or weakened point on the support arm, or between the support arm and a support. The use of a shear force sensor is advantageous in as much as it is produced in large numbers for other purposes and can therefore be used extremely cost-effectively.

However, the invention is not restricted to the use of a shear force sensor in a parallelogram carrier, but instead also includes the use of a shear force carrier for imbalance measurement in a stand quite generally. This is because the finding relating to the possible use of a shear force sensor for balance measurement can be advantageous even in other stand designs which manage without a parallelogram carrier, particularly since it leads to a considerable reduction in cost and saving in space in the measuring device.

The state in which the imbalance forces in a support arm of a parallelogram carrier can best be measured is that in which at least one link of the parallelogram carrier is braked or in which the aforementioned support is braked, but the support arm itself can drift slightly. In particular when the sensor, which then under certain circumstances operates as a bending sensor is arranged in the vicinity of the brake, the imbalance can be measured with good measurement accuracy in the braked state.

Furthermore, the use of a platform weighing cell has proven to be particularly cost-effective.

The invention can advantageously be used in a new stand corresponding to the commonly-owned and concurrently filed utility patent applications U.S. application Ser. No. 10/010101 (corresponding to German application DE 200 19 105), U.S. application Ser. No. 10/010103 (corresponding to German application DE 200 19 109), and U.S. application Ser. No. 10/007168 (corresponding to German application DE 200 19 107) filed on the same date, Nov. 8, 2001, by the applicant, which copending U.S. applications are hereby incorporated by reference into the present application.

BRIEF DESCRIPTION OF THE DRAWINGS

By using the figure description, the present invention will be explained in more detail by way of example. In the figures:

FIG. 3 shows the design of a parallelogram carrier in a preferred configuration for a surgical microscope stand, in side view;

FIG. 4 shows the lower support arm of the parallelogram carrier from FIG. 3, in side view;

FIG. 5 shows the support arm according to FIG. 3 in plan view;

The figures are described in an overlapping fashion, identical reference symbols signifying identical components, reference symbols with the same numbers but different indices signifying slightly different components with identical tasks and/or similar effects.

DETAILED DESCRIPTION OF THE INVENTION

Figure 1:
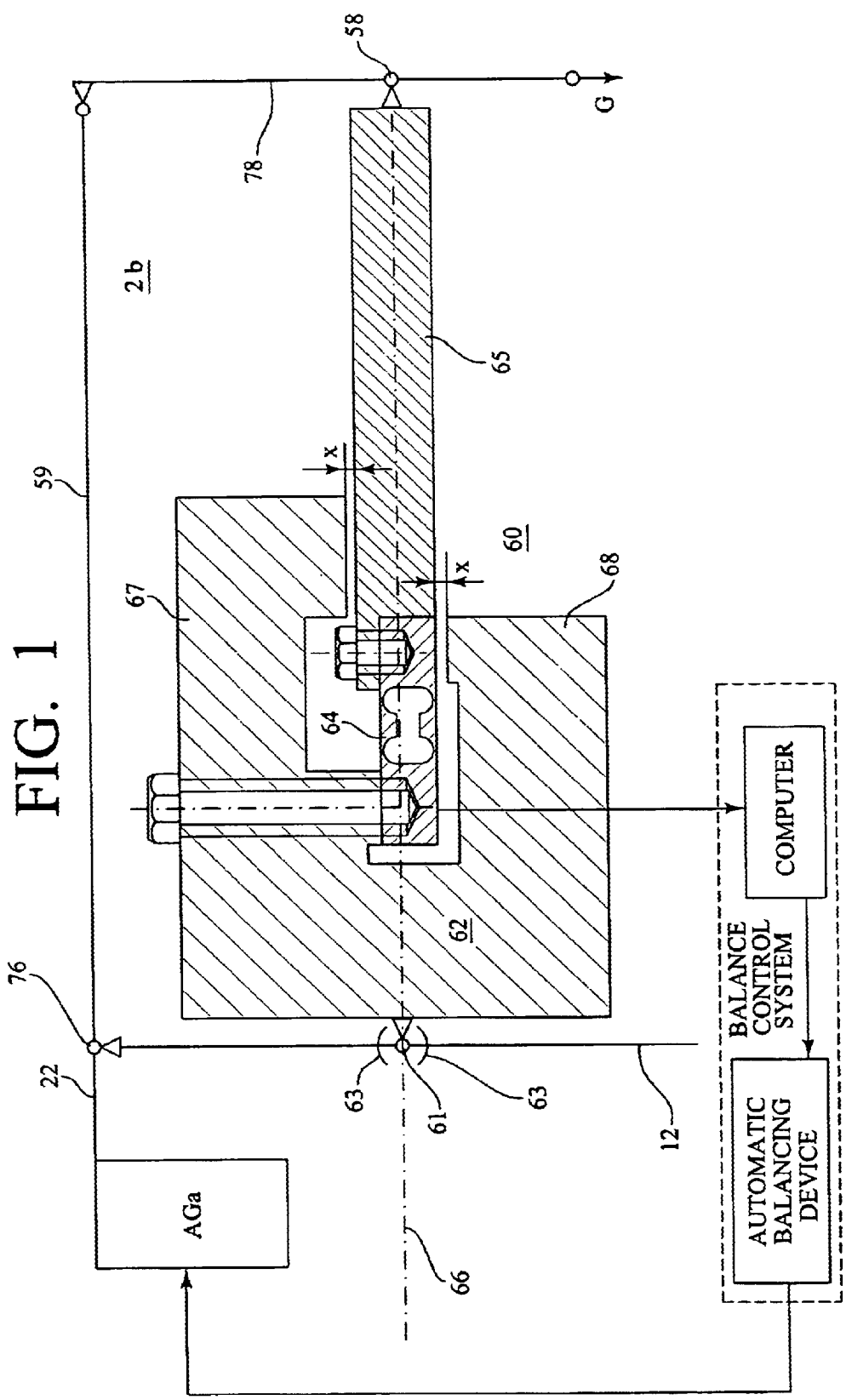
FIG. 1 shows a schematic illustration of a parallelogram carrier with incorporated measuring sensor and brake.

The load G—a surgical microscope in the preferred application—is suspended, by means of pivoting supports not specifically illustrated (for example a pivoting support in accordance with the international Patent Application WO 97/47240 from the Applicant) on a stand. The pivoting support and therefore the load G acts on the outermost lower link 58 of a parallelogram carrier designated overall by 2b. The upper support arm 59 is of conventional design, while the lower support arm 60 has a novel construction. In the area of its pivot 61 on the stand side on a base 12, it is of weakened material or interrupted design.

A basic part 62 is attached to the base 12 via a brake (brakeable coupling) 63. The basic part 62 can be prevented from pivoting up and down by activating the brake 63. Rigidly connected to the basic part 62 is a measuring unit 64 which is designed as a platform weighing cell and which, at its other end, rigidly accommodates the support arm part 65 of the support arm 60. The connection between the basic part 62 and the support arm part 65 via the measuring unit 64 is so stable that, when the brake 63 is released, the lower support arm 60 can pivot up and down parallel to the upper support arm 59.

In the engaged state of the brake 63, however, the following phenomenon occurs: In the balanced state, which is reached when, for example, a balance weight AGa indicated symbolically produces the numerically equal but opposed torque to that produced by the load G, the lower support arm 60 is loaded only in compression. The single force component acting on the lower support arm 60 therefore extends from the link 58 as far as the pivot 61 along its longitudinal axis 66. The sensor 64 is insensitive to tensile/compression loading, that is to say no imbalance values are measured on the basis of these forces.

In the event of an imbalance, however, transverse forces, which can be measured, occur at the interrupted or weakened point. Transverse forces within the context of this invention are produced by forces or moments which act obliquely or perpendicularly on the longitudinal extent of the support arm 60—the lower support arm in the present example.

If, however, when the brake 63 is engaged, the load G is increased without any simultaneous change in the balance weight AGa, then this leads to a bending or shear loading at the sensor 64: The force vector acting along the longitudinal axis 66 in a balance state then acts obliquely with respect to the longitudinal axis 66. However, since the brake 63 is engaged, a bending or shear force arises at the sensor 64, and can preferably be detected by this sensor 64.

As is familiar to those skilled in the art, such detected forces can be used electronically to control a balance weight. Since an extremely wide range of such control systems are known to those skilled in the art, for example in the Leica OHS(™) from the applicant, and also in the case of other stands on the market with automatic or semi-automatic balancing, the electronic part of the invention will not be discussed in more detail here. The critical factor is that at the sensor 64, forces are measured when the parallelogram 2b enters an unbalanced state.

The basic part 62 may possibly be equipped, beyond the fundamental requirement for its function, with further features, which constitute a development of the invention: An upper support arm 67 and a lower support arm 68 project beyond the sensor 64 and reach as far as the support arm part 65. With respect to the latter, they have a clearance designated by "x". This clearance provides the sensor 64 with sufficient space to produce its sensor output. However, it is so small that, in the event of a particularly high load or overload, contact between the support parts 67 or 68 and the support arm part 65 occurs, the latter support themselves mutually and, as a result, prevent any damage to the sensor 64.

Figure 2:
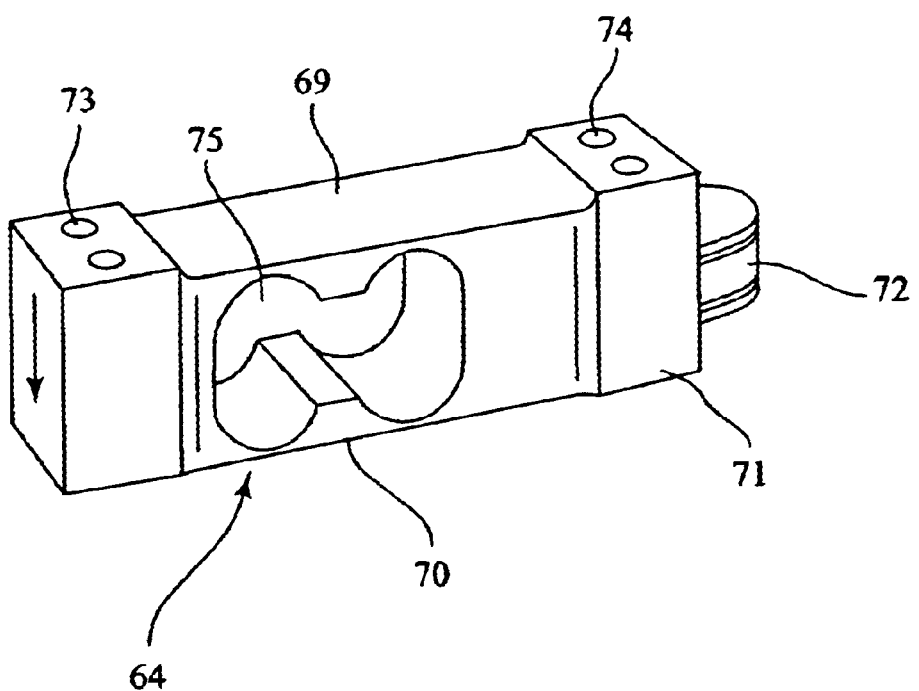
FIG. 2 shows the mechanical design of a platform weighing cell which can be used according to the invention.

FIG. 2 reveals the perspective view of a sensor 64 used in accordance with the invention. It has measuring zones 69 and/or 70, a sealed electronic circuit 71 and connecting cables 72. Such a sensor is, for example, a PW4F-2 platform weighing cell from HBM Spectris Group/Darmstadt (Germany).

Provided at both ends of the sensor 64 are threaded holes 73 and 74, in order firstly to be screwed to the basic part 62 and secondly to be screwed to the support arm part 65. The centrally arranged double oblong hole cut-out 75 may vary in its shape from sensor to sensor, but in the form shown for the present application corresponds to a standard design.

Figure 2A:
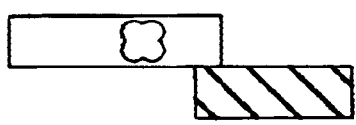
FIG. 2a shows the schematic use of such a platform weighing cell.

FIG. 2a shows in schematic form the clamping or application of a platform weighing cell selected as a bending or shear force sensor 64.

Figure 6:
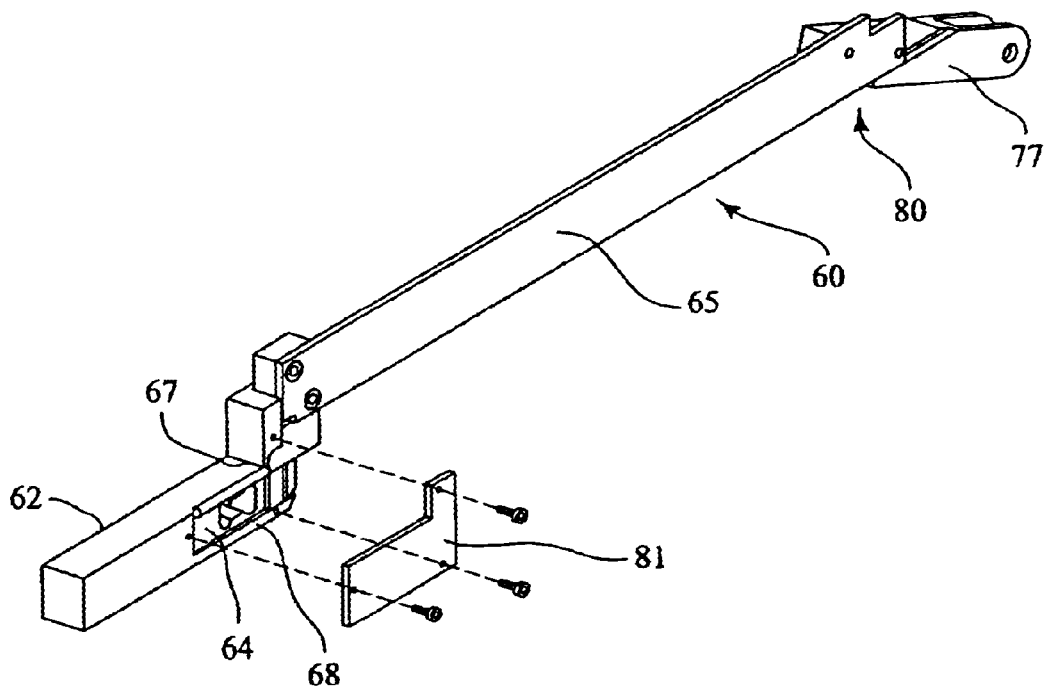
FIG. 6 shows a perspective view of the support arm from FIGS. 3 and 4, with the cover plate in the sensor area removed.

In the design according to FIG. 3, the outrig of a stand is illustrated in its horizontal rest position. Situated on the base 12 is the brakeable pivot 61 on the stand side, with the brake 63 and a pivot point 76 for the upper support arm 59 of the parallelogram carrier 2b. The latter is of telescopic design, so that in principle one can see the upper support arm 59, which is designed with a U-shaped cross section and in its interior accommodates the upwardly angled part of the lower support arm 60. The lower support arm 60 is divided into two, as shown schematically in FIG. 1, and comprises the support arm part 65 and the basic part 62, in which the sensor 64 according to FIG. 6 is integrated.

Mounted at the pivoting point 58 is a pivoting carrier 79, which accommodates the load G or a surgical microscope.

The upper support arm 59 is lengthened beyond its pivoting point 76 and forms the balance arm 22 there. Displaceably mounted on the latter is a sliding pad 23, to which a cable pull 24 is fixed. On the lower area (not shown) of the cable pull 24, a balance weight AGa is suspended. The sliding pad 23 can preferably be displaced under electronic or electrical control, on the basis of the bending or shear forces determined at the sensor 64 in the basic part 62.

In the present invention, the balancing area; that is to say the area to the left of the pivoting points 61 and 76, is preferably designed in the way specified in U.S. application Ser. No. 10/010101 (corresponding to German application DE 200 19 105) and U.S. application Ser. No. 10/010103 (corresponding to German application DE 200 19 109). It is further preferred, in that event of cable pull 24 being used as specified in the exemplary embodiment according to FIG. 3, to use a cable safeguard corresponding to that disclosed in U.S. application Ser. No. 10/007 168 (corresponding to German application DE 200 19 107).

The detailed design of the pivoting carrier 79 will not be discussed in the present text, since it has no significant importance for the design and the fitting of the sensor 64 or for the design of the parallelogram carrier 2b.

The design of the lower support arm 60 shown in FIGS. 4–6 shows an optimally integrated basic part 62 and a single, slat-like support arm part 65, which is accommodated in an optimum manner by the upper support arm 59 cut out in a U shape. The support arm part 65 can also comprise parallel part-supports for molded tubes. At the outer end of the support arm part 65 there is a lengthened arm segment 77, which is designed like a fork, to accommodate the vertical support arm 78 of the parallelogram carrier 2b and/or to accommodate the pivoting carrier 79. At the point 80, a locking means can be arranged between the upper support arm 59 and the lower support arm 60.

The sensor 64 is protected by a cover 81 in the basic part 62.

Figure 7:
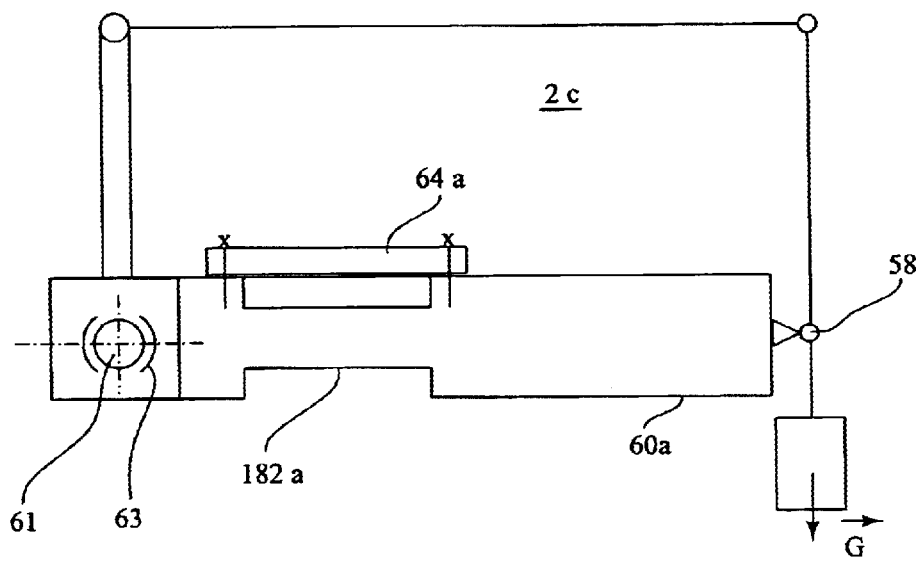
FIG. 7 shows a variant with a force measuring or strain sensor which, according to the invention, is used a bending sensor.
Figure 8:
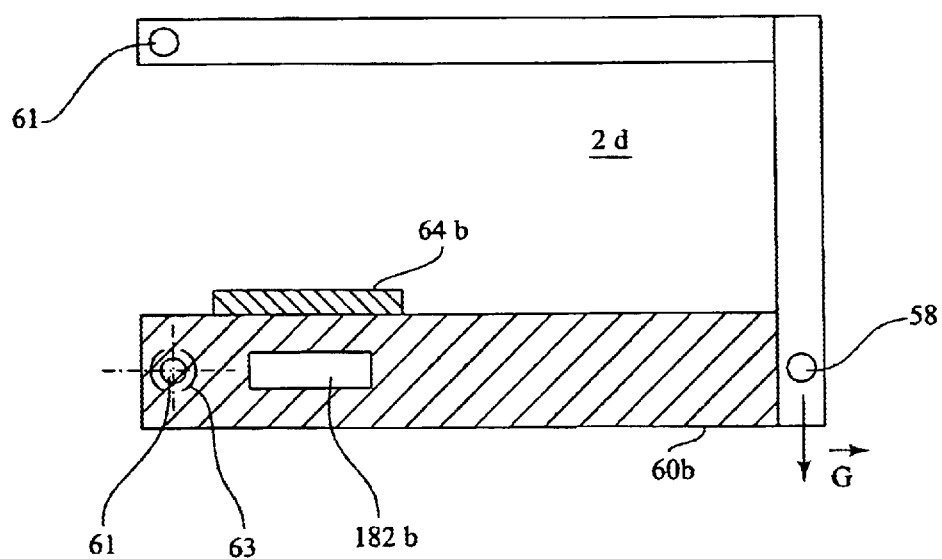
FIG. 8 shows a variant of the design according to FIG. 7.

The designs according to FIGS. 7 and 8 represent variants of the invention, in which, instead of a platform weighing sensor, conventional bending sensors 64a and 64b are used. These sensors are situated at points at which the lower support arm 60a or 60b is weakened. The bending values measured by the sensors 64a or 64b at these points correspond to the shear force values which are measured by the sensor 64, and therefore likewise permit conclusions to be drawn about the imbalance.

Figure 9:
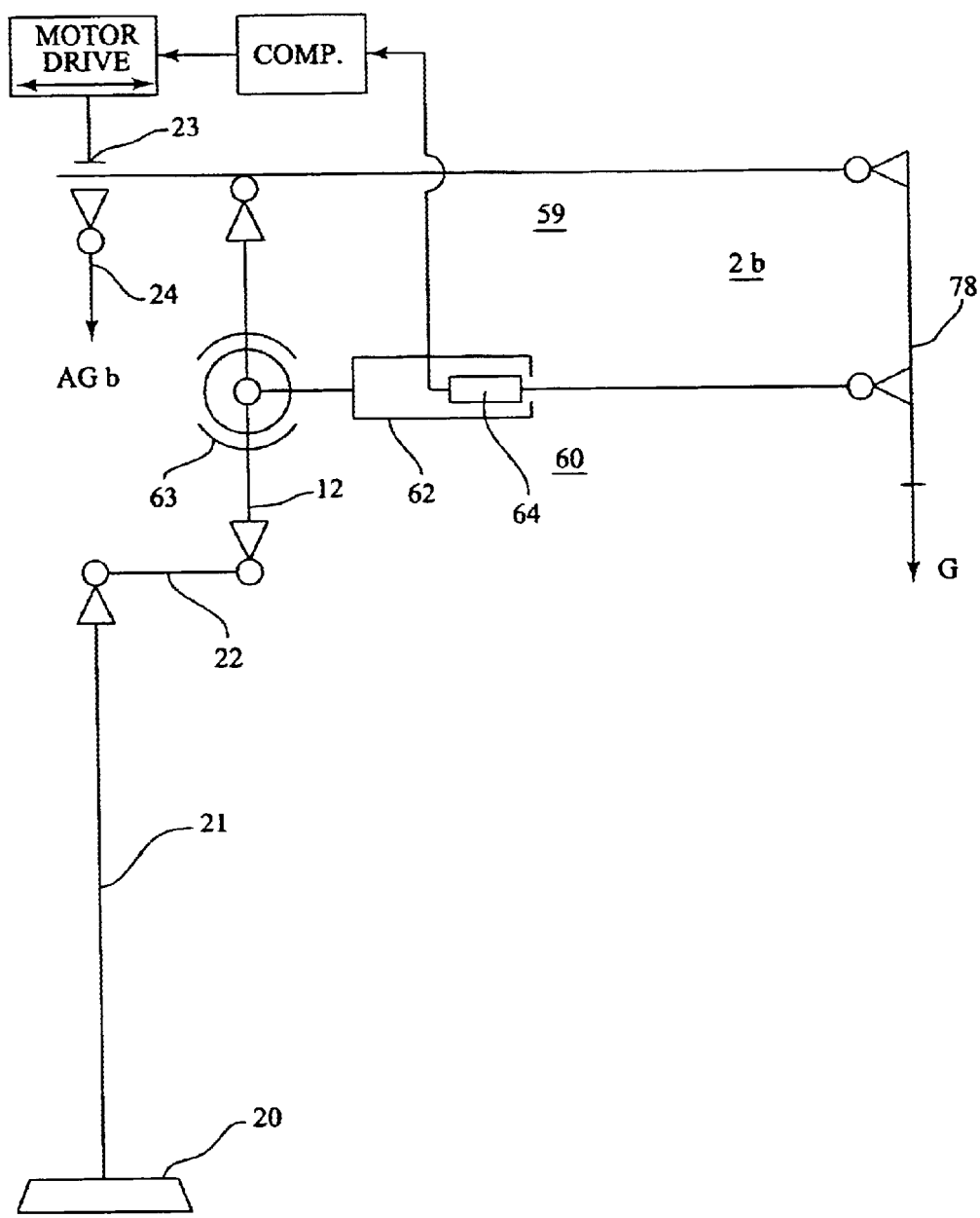
FIG. 9 shows a schematic stand design according to the invention.

In the symbolic design according to FIG. 9, it is possible to see the stand foot 20, a vertical support column 21 and a balance arm 22a projecting from the latter. This balance arm 22a can be pivoted about the support column 21. It carries the base 12, on which the parallelogram carrier 2b is pivotably mounted in the manner described. The cable pull 24 is only indicated, since the load balancing device is preferably designed as in U.S. application Ser. No. 10/010101 (corresponding to German application DE 200 19 105) or, alternatively, as in U.S. application Ser. No. 10/010103 (corresponding to German application DE 200 19 109 or U.S. application Ser. No. 10/007168 (corresponding to German application DE 20019107).

Figure 10:
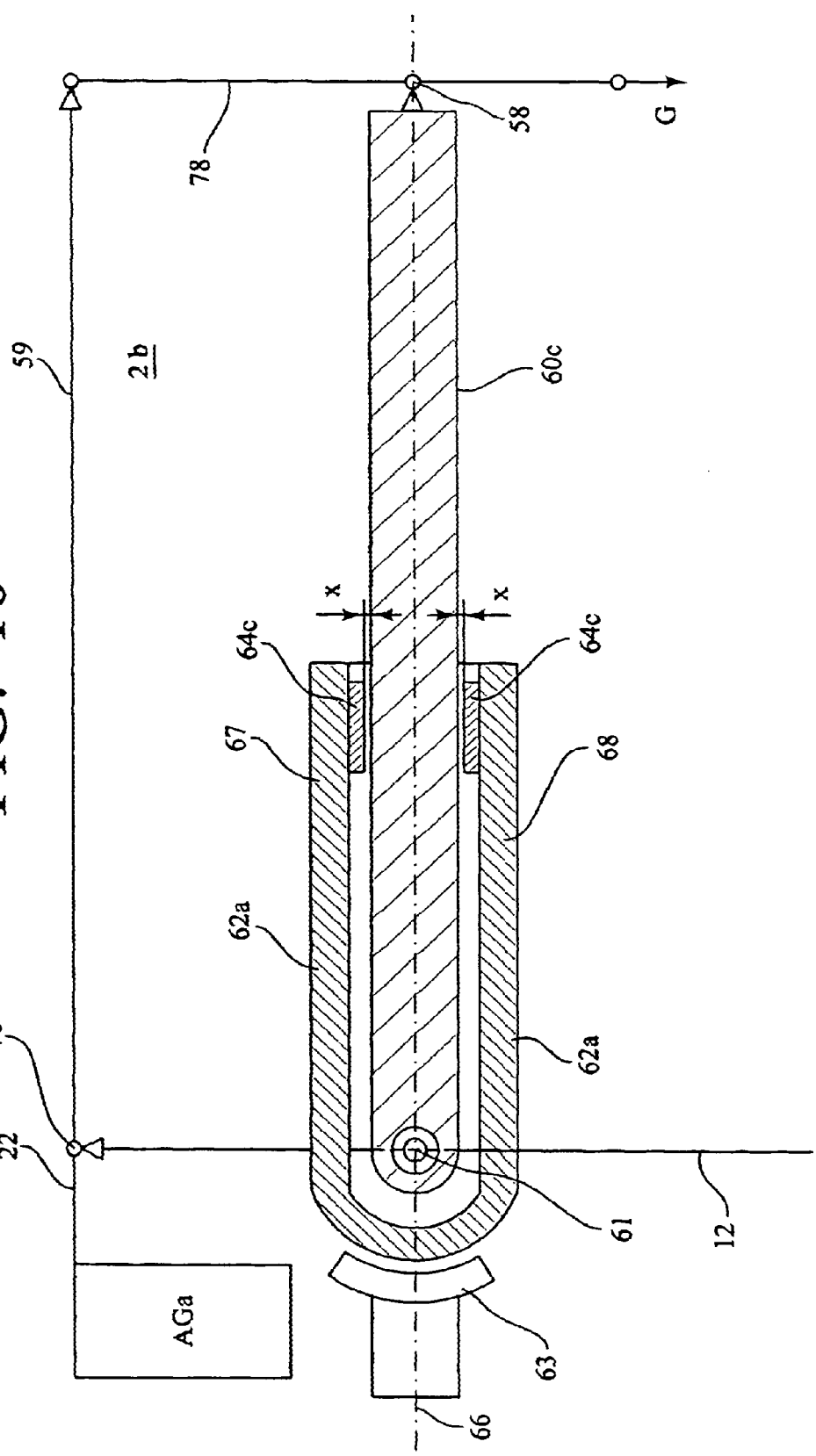
FIG. 10 shows a schematic overall design of a stand according to the invention having two pressure sensors.

FIG. 10 reveals a schematic stand design, in which the lower support is configured as a continuous support arm 60c. It reaches from the link 58 as far as the pivot 61 on the stand side, at which not only the support arm 60c, but also the substantially fork-like basic part 62a is pivotably mounted. The mobility of the basic part 62a can be braked by a brake 63. The mobility of the support arm 60c at the pivoting point 61 is consequently restricted to the clearance x.

Fitted to the support arms 67 and 68 are pressure sensors 64c which, in the balanced state illustrated (and with the brake 63 engaged), have the clearance designated by "x" with respect to the support arm 60c. In the event of imbalance, a torque occurs about the link 76, which leads to the support arm 78 drifting upwards or downwards. The support arm 78 transmits this drift to the support arm 60c, so that if the brake 63 is engaged, the clearance x at the lower pressure sensor 64c increases or becomes smaller, while at the upper pressure sensor 64c the clearance x changes to the same extent in the opposite direction. As soon as one of the two sensors 64c is touched, and therefore a compressive force occurs, this is measured and forwarded as an imbalance value.

Figure 11:
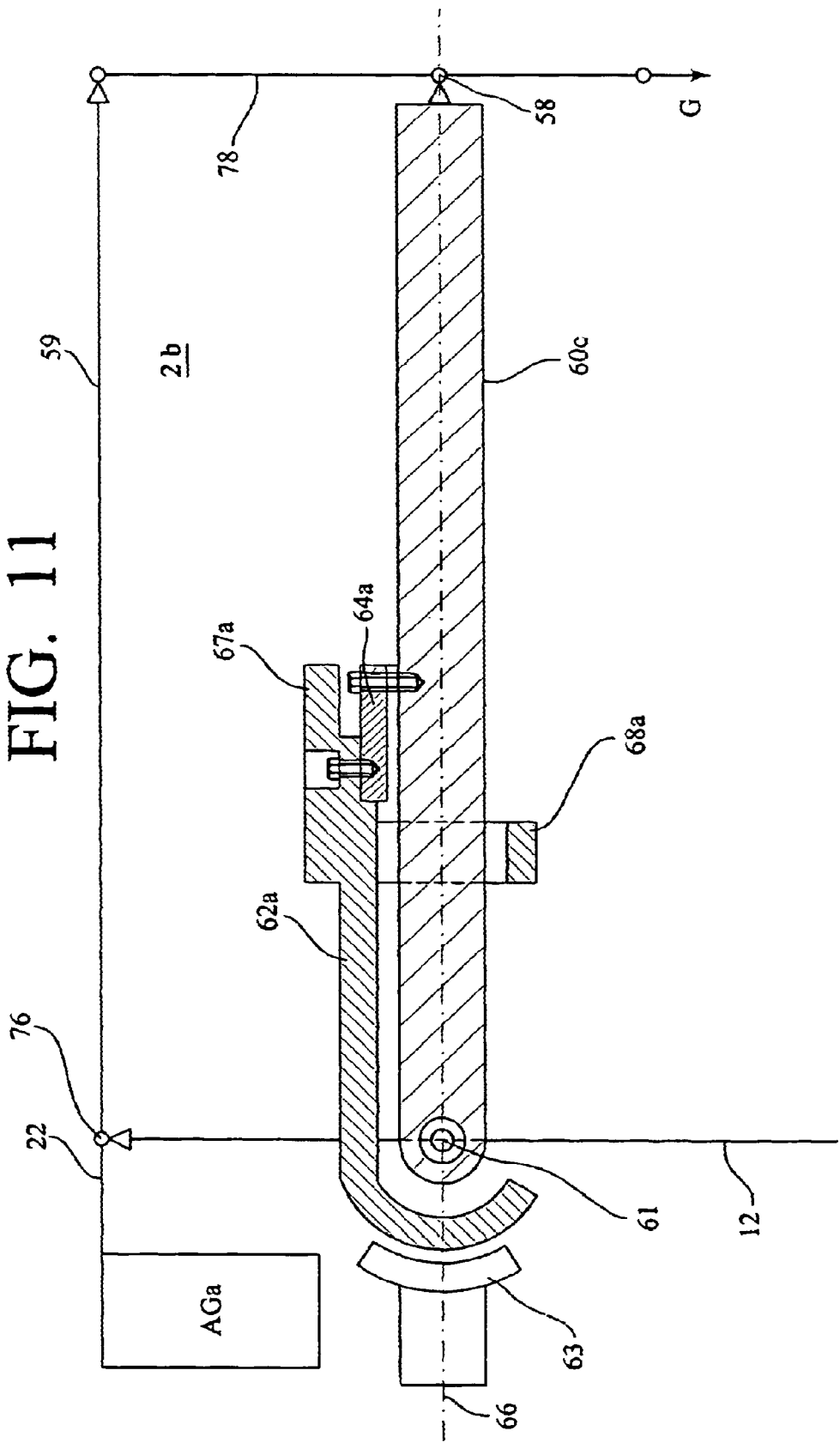
FIG. 11 shows a schematic overall design of a stand according to the invention having a shear force sensor fixed to the support arm.

FIG. 11 shows a variant of the design shown in FIG. 10, in which a shear force sensor 64a is used instead of the pressure sensors 64c. The former is firmly connected at one end to the individual support arm of the basic part 62a and at the other end to the support arm 60c, and is capable of accommodating and detecting the shear forces that occur when the brake 63 is engaged.

As compared with the design according to FIG. 10, the clearance x is dispensed with here. This could also be left out in the design according to FIG. 10, but this would necessary lead to complicated adjustment procedures in the case of the two pressure sensors 64c.

In a manner similar to the design according to FIG. 1, upper and lower support arms 67a and 68a are provided, in this design the lower support arm 68a projecting like a lug from the basic part 62a. Alternatively, these parts could also be arranged parallel to each other and connected by bolts or the like, the supporting faces being formed between the bolts or the like and oblong holes, larger bores or the like.

The present invention will preferably be used in the case of a standard design according to U.S. Patent Applications DE 200 19 107, DE 200 19 109 and DE 200 19 105 (respectively corresponding to German application nos. DE 200 19 107, DE 200 19 109 and DE 200 19 105) filed on the same date. However, it is not restricted to such designs.

The following list of reference symbols is a constituent part of the description. The designs specified in the patent claims likewise count as disclosed in the same way as in the description. Support arms in the sense of the patent claims are to be understood to mean both individual support arms and parallelogram carriers or similar constructions.

| PARTS LIST | |
|---|---|
| 2b | Parallelogram carrier |
| 12 | Base and/or basic body |
| 20 | Stand foot |
| 21 | Support column |
| 22, 22a | Balance arm |
| 23 | Sliding pad |
| 24 | Cable pull |
| 58 | Link |
| 59 | Upper support arm |
| 60 | Lower support arm |
| 60a, b, c | Variants of the lower support arm |
| 61 | Pivot on the stand side (pivoting axis) |
| 62a | Basic part and/or measuring arm |
| 63 | Brake (brakeable coupling) |
| 64 | Measuring unit and/or sensor and/or platform load cell |
| 64a, b | Shear force sensor |
| 64c | Pressure sensor |
| 65 | Support arm part |
| 66 | Axis |
| 67 | Upper support arm |
| 68 | Lower support arm |
| 69, 70 | Measuring zone |
| 71 | Electronic circuit |
| 72 | Connecting cable |
| 73 | Threaded bore |
| 74 | Threaded bores |
| 75 | Double oblong hole cutout |
| 76 | Pivoting point |
| 77 | Arm segment |
| 78 | Vertical support arm |
| 79 | Pivoting carrier |
| 80 | Adjusting mechanism |

-continued

PARTS LIST

| 81 | Cover |
| 182a, b | Interrupted point in the support arm 60 |
| AGa | Balance weight |
| G | Load and/or weight of the microscope |

What is claimed is:

1. A stand capable of being balanced by way of a balance control system, said stand comprising:
   a base;
   a parallelogram carrier for accommodating a load, said parallelogram carrier comprising at least three support arms, wherein two of said at least three support arms are substantially parallel and supported with respect to said base;
   one of said two parallel support arms having a basic part pivotally attached to said base and a support arm part connected to said basic part;
   a brake for selectively fixing a pivotal position of said basic part relative to said base; and
   a measuring unit for measuring forces between said basic part and said support arm part and providing measurement data for use by said balance control stem.

2. The stand according to claim 1, wherein said measuring unit is arranged between said basic part and said support arm part.

3. The stand according to claim 2, wherein said basic part is arranged parallel to said support arm part.

4. The stand according to claim 2, wherein said basic part is at least partially arranged in series with said support arm part, and said sensor is mounted as a serial intermediate element between said basic part and said support arm part.

5. The stand according to claim 1, wherein said one of said two parallel support arms includes an interrupted portion having a reduced cross-sectional area, and said measuring unit is provided to detect transverse loadings at said interrupted portion.

6. The stand according to claim 1, wherein said brake operates proximate the point of pivotal attachment between said basic part and said base.

7. The stand according to claim 1, wherein said measuring unit comprises an electronically operated sensor.

8. The stand according to claim 7, wherein said sensor is fixed directly to said one of said two parallel support arms.

9. The stand according to claim 7, wherein said one of said two parallel support arms is of unitary construction and includes a weakened portion having a reduced cross-sectional area, said weakened portion dividing said one of said two parallel support arms into said basic part and said support arm part, and wherein said sensor bridges said interrupted portion.

10. The stand according to claim 7, wherein said sensor is arranged in the vicinity of said brake.

11. Stand according to claim 7, wherein said sensor is a sensor chosen from the group of sensors consisting of a shear force sensor, a bending moment sensor, and a compressive force sensor.

12. The stand according to claim 7, wherein said sensor is a shear force sensor arranged to measure the shear forces between said basic part and said support arm part.

13. The stand according to claim 7, wherein said sensor is a platform weighing cell.

14. The stand according to claim 7, wherein said one of said two parallel support arms includes a weakened portion dividing said one of said two parallel support arms into said basic part and said support arm part, and wherein said sensor is arranged at said weakened portion of said support arm.

15. The stand according to claim 7, further comprising at least one overload support element for engaging said one of said two parallel support arms in the event of overload.

16. The stand according to claim 1, wherein said two parallel support arms comprise an upper support arm and a lower support arm, and said measuring unit is associated with said lower support arm.

17. The stand according to claim 7, wherein said balance control system comprises a computer for controlling input of said sensor data to said balance control system.

18. The stand according to claim 17, wherein said balance control system comprises an automatic balancing device, and said sensor data are supplied to said automatic balancing device.

19. The stand according to claim 1, further comprising a cable pull and a mass suspended on said cable pull to act as a balance weight.

20. The stand according to claim 19, further comprising a balance arm connected to said base, a pad slidably mounted on s aid balance arm and connected to said cable pull, and an electric motor coupled to said pad for displacing said pad along said balance arm.

* * * * *